United States Patent [19]

Crothers

[11] 4,222,585
[45] Sep. 16, 1980

[54] FOLDING CART

[76] Inventor: William R. Crothers, 424 W. Springfield Rd., Springfield, Pa. 19064

[21] Appl. No.: 939,398

[22] Filed: Sep. 5, 1978

[51] Int. Cl.³ ............................................. B62B 11/00
[52] U.S. Cl. .................................. 280/654; 280/47.26
[58] Field of Search ................ 280/638, 639, 38, 651, 280/652, 653, 654, 47.26, 47.24

[56] References Cited

U.S. PATENT DOCUMENTS

| | | | |
|---|---|---|---|
| 2,431,834 | 12/1947 | Sinclair | 280/652 X |
| 2,437,029 | 3/1948 | Howard | 280/639 |
| 2,789,829 | 4/1957 | Parker | 280/652 X |
| 2,938,748 | 5/1960 | Johnson | 296/27 |
| 2,992,011 | 7/1961 | Becan | 280/652 X |
| 3,106,303 | 10/1963 | Finocchiaro | 280/651 |
| 3,367,676 | 2/1968 | Pearson et al. | 280/652 X |
| 3,388,919 | 6/1968 | Waag | 280/651 X |
| 3,690,692 | 9/1972 | Florian et al. | 280/639 |
| 3,936,068 | 2/1976 | Dorman | 280/47.33 X |
| 4,061,360 | 12/1977 | Evans et al. | 280/652 |

FOREIGN PATENT DOCUMENTS 1520984 3/1968 France ...................................... 280/652

Primary Examiner—John J. Love
Assistant Examiner—Michael Mar
Attorney, Agent, or Firm—George A. Smith, Jr.

[57] ABSTRACT

A folding cart comprising a fabric body and a collapsible tubular frame comprises tubular members extending longitudinally underneath the bottom of the fabric body for supporting the load and preventing the formation of pockets which impede unloading. Wheels are located behind and underneath the body, and are prevented from coming into contact with the body by protective fenders which also serve as collapsible braces for locking the frame elements in the open condition. The front edge of the bottom of the body is protected by a clamping member. The tubular members underneath the body are arranged substantially in an inclined plane in order to insure that the front edge of the body is able to come into contact with the ground despite irregularities therein.

9 Claims, 10 Drawing Figures

FOLDING CART

BRIEF SUMMARY OF THE INVENTION

This invention relates to a folding cart of the type comprising a body of fabric or other flexible sheet material and a collapsible supporting frame made up of aluminum tubing or a similar rigid material. The invention has utility in cleaning up leaves, grass cuttings and other debris in the yard.

Various folding carts having fabric bodies and tubular frames have been proposed for use in gathering leaves and the like. Examples of such carts are found in U.S. Pat. Nos. 2,992,011, dated July 11, 1961 to A. F. Becan and 3,388,919, dated June 18, 1968 to N. A. Waag. A common characteristic of these prior carts is the fact that the section of fabric which supports the load is supported from the front edge of the frame, which is in turn connected to the wheel axle by longitudinal frame members extending along the edges of the load-supporting section of fabric. Another common characteristic of these prior designs for folding carts is the fact that the wheels are located laterally to the exterior of the fabric body. Still another common characteristic is the fact that the front edge of the fabric body, over which leaves are raked is exposed to contact with the rake, and hence subject to eventual destruction by abrasion.

In these prior designs, since the frame members run longitudinally along the sides of the load-supporting section of the fabric body, the load is necessarily carried by a large expanse of fabric. The fabric has to be very strong in order not to tear under repeated large loads. Deformation of the fabric by the load also results in the formation of a depression or pocket which impedes dumping of leaves and cuttings by the forward tilting of the cart. The location of the wheels laterally to the exterior of the fabric body in these prior designs means that the overall lateral dimension of the cart is quite large for a given load capacity. This makes the cart unwieldy and difficult to store, even in the folded condition. Furthermore, the wide separation of the wheels made these prior carts somewhat difficult to maneuver.

The cart in accordance with the invention comprises a scoop-shaped body of flexible sheet material such as glass fiber-reinforced polyethylene. The flexible sheet material is formed so that the body has an open front, a bottom wall, a rear wall, and side walls extending upwardly from the bottom wall. The transition between the various walls need not be well-defined. A pair of wheels are provided, the wheels being rotatable on an axis located adjacent the intersection of the rear wall and the bottom wall. The frame comprises a first substantially rigid frame member extending underneath the bottom wall from the front edge thereof to the wheel axis, and a second substantially rigid frame member extending behind the rear wall from the wheel axis at least to the upper edge of the rear wall. For folding, the first and second frame members are pivotally connected together substantially at the location of the wheel axis, whereby the upper edge of the rear wall can be brought into close proximity to the front edge of the bottom wall. The frame member which extends underneath the bottom wall of the body preferably comprises at least two rigid members extending longitudinally from the front edge of the bottom wall substantially to the location of the wheel axis. These rigid members are laterally spaced from each other, and are also spaced laterally inwardly from the side walls of the body so that they provide direct support for the load, relieving the stress on the flexible sheet material. These longitudinally extending members also prevent the formation of large pockets in the bottom of the body which impede dumping.

Another important feature of the invention resides in the fact that the wheels are located behind the body, and laterally inwardly with respect to the locations of the side walls. This feature gives rise to a more compact construction, making storage of the cart easier, and improving its maneuverability. Means are provided for preventing contact between the flexible sheet material of the body and the wheels. In accordance with the preferred embodiment of the invention, the means for preventing contact between the wheels and the body also serve as collapsible brace means connecting the first and second frame members and adapted to prevent said members from being folded toward each other when the body is in an opened condition. These collapsible brace means are located between the flexible sheet material and the wheels. Preferably, each collapsible brace means comprises a first element pivotally secured at one end to the first frame member underneath the body and rotatable about an axis substantially parallel to the wheel axis, and a second element pivotally secured at one end to the second frame member behind the rear wall of the body and rotatable about another axis substantially parallel to the wheel axis. These first and second elements of the brace means are hinged together at an intermediate location between the frame members, and one of the first and second brace elements extends beyond the location at which the elements are hinged together and is adapted to contact, with its opposite end, the frame member to which the other of said first and second brace elements is pivoted. The length of said one of said first and second elements is preferably such that its opposite end contacts the opposite frame member only when the brace elements are moved slightly beyond their parallel condition in the unfolding direction.

It is an object of the invention to improve the load-carrying capability of a folding cart having a flexible body.

Another object of the invention is to prevent the formation of large pockets which impede dumping of material from a folding cart having a flexible body.

A further object of the invention is to provide a more compact folding cart.

Also among the objects of the invention are the simplification of the structure of a folding cart, the improvement of durability, and various other objects which will be apparent from the following detailed description when read in conjunction with the drawings.

DETAILED DESCRIPTION

Figure 1:
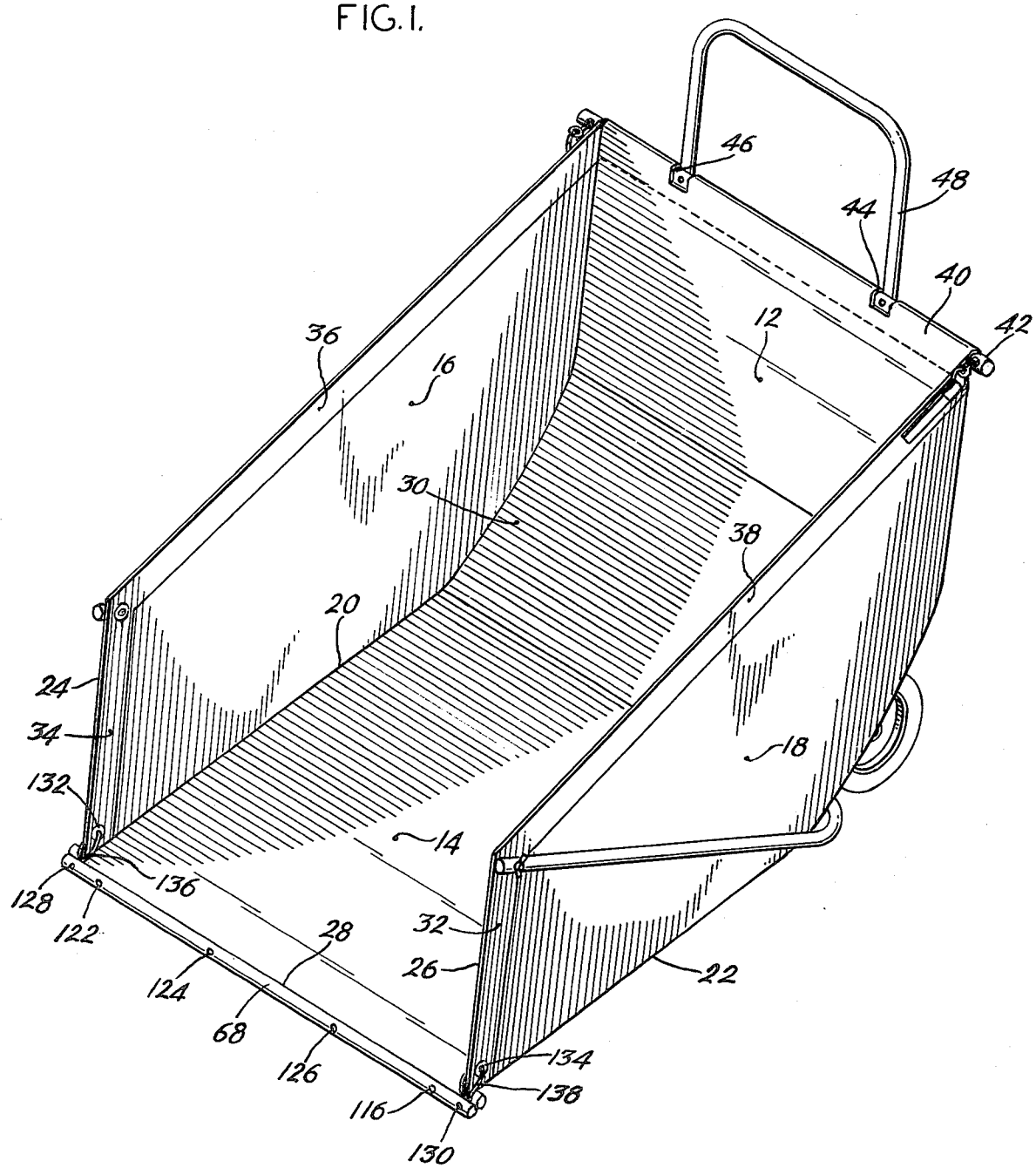
FIG. 1 is an oblique perspective view of a preferred folding cart in accordance with the invention.

As shown in FIG. 1, the cart comprises a scoop-shaped body of flexible sheet material having a rear wall 12, a bottom wall 14 and side walls 16 and 18 extending upwardly from the opposite edges 20 and 22 of bottom wall 14. Side wall 16 has a substantially vertical front edge 24, and side wall 18 has a similar front edge 26, both of these front edges extending upwardly from the opposite ends of front edge 28 of bottom wall 14 to provide the scoop-shaped body with an open front.

The transition between rear wall 12 and bottom wall 14 need not be well-defined, and can take the form of a sloping surface 30 as shown in FIG. 1. Likewise, the transition between the side walls and the bottom and rear walls need not be well-defined.

Preferably, the body is formed from three sheets of flexible material sewn together. Desirably the bottom wall 14 and the rear wall 12 are formed from a single sheet of material. The side walls 16 and 18 are sewn to this single sheet, so that seams are formed along the bottom and rear edges of the side walls. Reinforcing hems are provided at 32 and 34 along the front edges of the vertical walls, and at 36 and 38 along the top edges of the vertical walls. A tubular hem 40 is formed at the top edge of rear wall 12, and receives a tubular cross-member 42. Cut outs 44 and 46 are provided in tubular hem 40 to permit connection of tubular member 42 to rear frame member 48.

The body can be made from any one of a wide variety of flexible sheet materials such as canvas, glass fiber-reinforced polyethylene or various other types of reinforced plastics.

Figure 2:
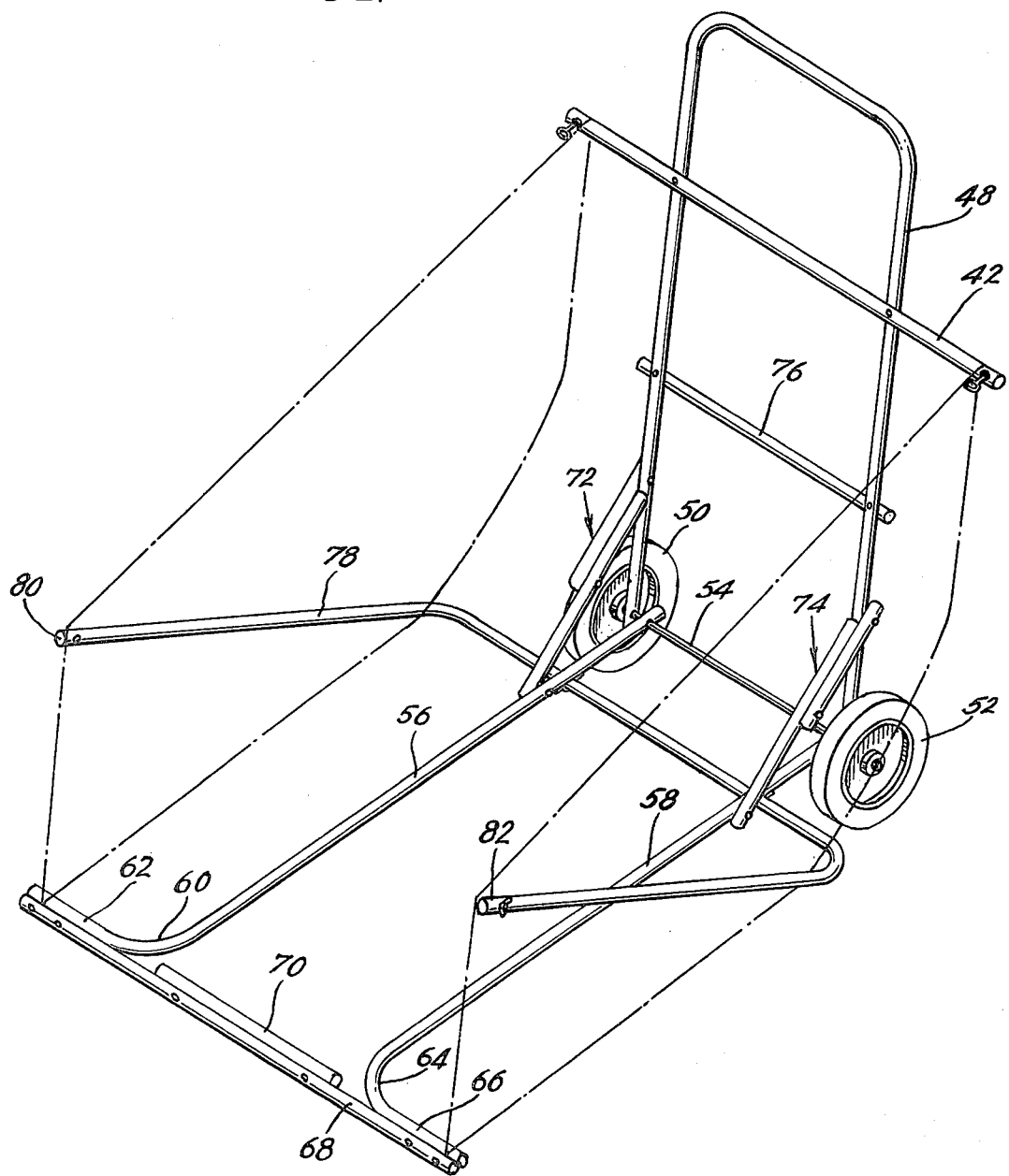
FIG. 2 is an oblique perspective view of the frame structure of the cart.

Referring to FIG. 2, a pair of wheels 50 and 52 are rotatably supported at opposite ends of an axle 54, axle 54 defining an axis of rotation for the wheels. The axis of rotation is preferably located adjacent an imaginary line which would be formed by the intersection of rear body wall 12 and bottom body wall 14 if the rear wall were extended downwardly and the bottom wall were extended rearwardly. Wheels 50 and 52 are preferably provided with semi-pneumatic rubber tires, and are supported on axle 54 for rotation by suitable bearings, for example PTFE or Nylon bearings.

The frame comprises two substantially rigid frame members pivotally connected together substantially at the location of the wheel axis. The pivotal connection is most easily accomplished by connecting the frame members directly to axle 54. The first frame member comprises a pair of rigid lengths 56 and 58 of aluminum tubing. These lengths of tubing extend longitudinally underneath the bottom wall of the body from the front edge of the bottom wall to axle 54. Axle 54 extends through transverse holes near the ends of members 56 and 58 so that these members are pivotable about the axle in vertical planes. Members 56 and 58 are spaced laterally from each other, but are spaced laterally inwardly from the side walls of the flexible body. In a typical cart having a bottom wall width of 36 inches, the center lines of members 56 and 58 are spaced from each other by 16 inches, and each is spaced from the nearest side wall by 10 inches. Members 56 and 58 are located directly underneath the bottom wall of the body, and serve to transfer the load directly to the wheel axis, relieving the flexible material of the body.

Element 56 is bent outwardly at a right angle at bend 60 adjacent the front edge of the bottom wall of the flexible body to provide a clamping section 62. Member 58 is similarly bent in the opposite direction at 64 to provide a clamping section 66. These laterally extending clamping sections 62 and 66 are secured by screws and wing nuts to a transverse length of tubing 68, which acts as a protective clamping member securing the front edge of the bottom wall of the body to the framework, and at the same time, protecting the front edge of the flexible material from damage. Length 68 of tubing also acts as a structural member of the frame, securing the forward ends of elements 56 and 58 in fixed relationship to each other. An additional length 70 of tubing is secured to tubing 68, and is aligned with and located between sections 62 and 66. The intermediate portion of the front edge of the bottom wall of the body is clamped between tubing lengths 68 and 70.

The other principal frame element 48 comprises an inverted U-shaped tubular member, the width of which is slightly larger than the distance between bottom frame elements 56 and 58. Member 48 is similarly pivoted on axle 54, the axle extending through aligned holes in the lower ends of the two vertical sections of element 48. Element 48 extends above transverse tubular member 42 forming a handle.

The vertical elements of frame member 48, which are perpendicular to the wheel axis, are spaced inwardly with respect to the side walls. When the load is being transported and the cart is tilted backwardly, these vertical elements function, in the same manner as members 56 and 58 of the bottom frame member, to support the load and relieve stress on the flexible sheet material.

Since the two principal frame elements are pivotally connected together substantially at the location of the wheel axis, the upper edge of the rear wall, which is secured to transverse tubular element 42, can be brought into close proximity to the front edge of the bottom wall, which is clamped by elements 68, 70, 62 and 66. When the cart is in its open condition as shown in FIG. 2, the frame elements form an obtuse angle with each other (about 100°). The principal frame elements can be locked in this relationship by collapsible braces 72 and 74.

A reinforcing element 76 is connected between the vertical elements of frame member 48 at a location below tubular member 42 and behind the rear wall of the body. The main purpose of this reinforcing element is to insure that the lower ends of frame member 48 are held in rigidly fixed relationship to each other, such relationship being important for proper and reliable operation of the collapsible braces.

A third frame member 78, which comprises a substantially rigid U-shaped aluminum tube supports the side walls. Member 78 is supported in U-shaped brackets (see bracket 79 in FIG. 4) underneath elements 56 and 58, and is pivotable therein so that its side elements are movable in vertical planes. The upper ends 80 and 82 of the respective side elements are secured to the front upper corners of the side walls of the body by means of screws and wing nuts, the screws extending through suitable grommets provided in the corners of the flexible sheet material. The rigid interconnection between the side elements of frame member 78 insures that they are prevented from moving laterally relative to each other, and thereby prevents the side walls of the body from collapsing toward each other.

Figure 3:
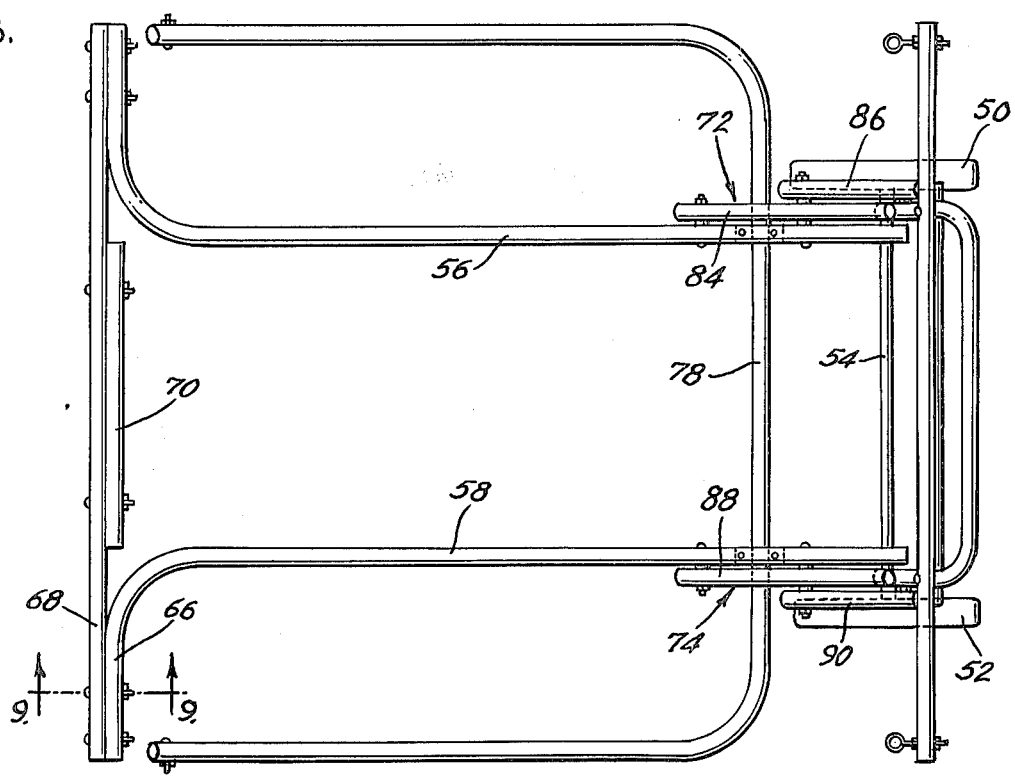
FIG. 3 is a top plan view showing the frame in an open condition.
Figure 4:
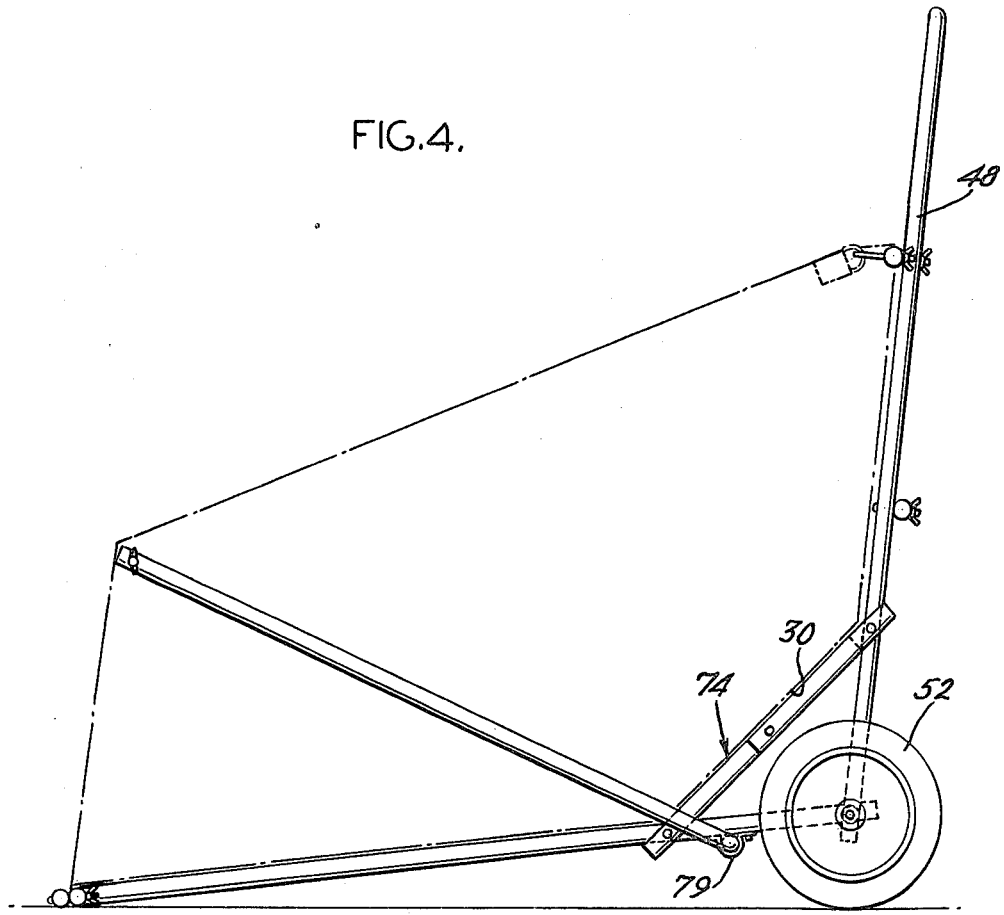
FIG. 4 is a side elevation showing the frame in an open condition.

FIG. 3, which is a top plan view of the frame in its open condition, shows the relationship between bottom frame member elements 56 and 58 and the side elements of U-shaped member 78, the latter being located outside and against the side walls of the flexible body. This figure also shows the positions of wheels 50 and 52, which are located laterally inwardly with respect to the side walls of the body. In FIGS. 3 and 4 it will be observed that collapsible braces 72 and 74 are located respectively adjacent wheels 50 and 52, and both above and in front of the wheels so that they function to prevent contact between the wheels and sloping surface 30 of the flexible body. The collapsible braces thus serve a multiple function: they lock the principal frame elements into the open position shown in FIG. 4; they help support the load; and they also serve to protect the flexible material of the body from damage by the rotation of the wheels, and therefore allow the wheels to be positioned inwardly with respect to the side walls for greater compactness and greater maneuverability than would otherwise be possible.

Preferably the collapsible braces are positioned so that, when the cart is in the opened condition and loaded, they conform to and contact surface 30 of the flexible body and thus aid the principal frame elements in supporting the load.

Figure 5:
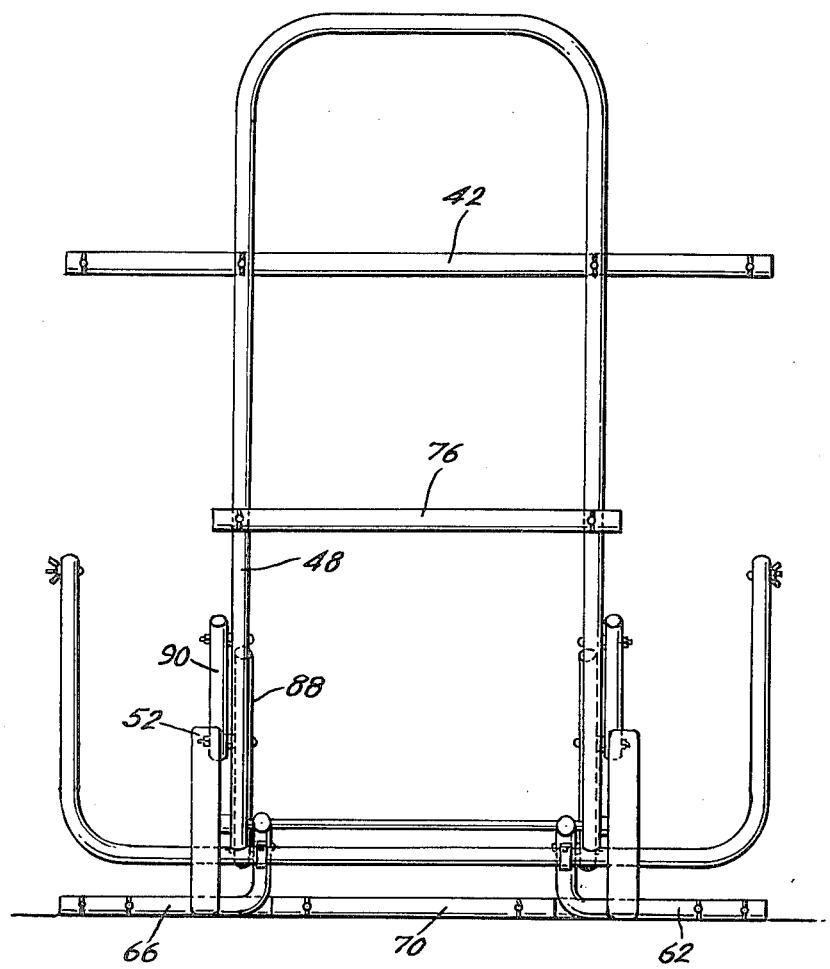
FIG. 5 is a rear elevation of the frame in an open condition.

As seen in FIG. 3, brace 72 comprises two lengths 84 and 86 of aluminum tubing. Brace 74 is similarly constructed from lengths 88 and 90 of aluminum tubing. For an understanding of the construction and operation of these braces, reference may be made to FIGS. 3, 5 and 10, showing the details of brace 74, it being understood that brace 72 is similarly constructed.

Figure 10:
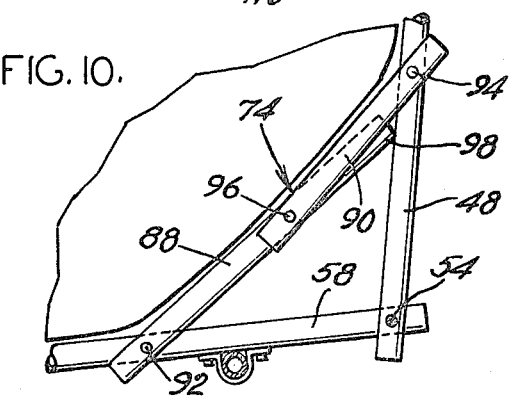
FIG. 10 is a fragmentary elevational view showing one of the folding braces in the fully opened condition.

As shown in FIG. 10, brace 74 is connected between a vertical element of frame member 48, and member 58 of the rigid frame member underneath the flexible body, these members being pivotable on axle 54.

Element 88 is pivotally secured at its lower end to frame member 58 by means of a pivot pin 92, which can be made from a bolt or similar fastener. Element 88 is rotatable about an axis which is substantially parallel to axis 54. Element 90 of the brace is similarly pivotally secured at its upper end to frame member 48 on pivot pin 94, and is similarly rotatable about an axis which is substantially parallel to axle 54. These elements are hinged together on pin 96 at an intermediate location between frame members 48 and 58.

While brace member 90 can be relatively short in length, the length of brace member 88 is such that its upper end 98 reaches and comes into contact with frame member 48 when the frame is in its fully opened condition as shown, i.e. when the principal frame members are at an angle to each other of about 100°. Desirably, the length of brace member 88 is such that its upper end 98 contacts frame member 48 only when the brace elements 88 and 90 are moved slightly beyond the parallel condition in the direction of unfolding the cart. This is the condition illustrated in FIG. 10, wherein the brace elements are not precisely parallel with each other.

Since the brace elements can be pushed beyond the parallel condition as unfolding of the cart proceeds, they provide a toggle action by which the principal frame members can be locked and held in the open condition, and yet readily unlocked for folding by lifting end 98 of the brace (and the corresponding part of the opposite brace) away from frame member 48.

From FIG. 5 it will be observed that brace element 88 and the left-hand vertical element of frame member 48 overlap each other. Positioning element 88 in this way so that its upper end contacts frame member 48 eliminates the need for complex parts to produce the locking action. The upper brace element 90, being to the left of frame member 48, is ideally positioned to act as a fender over wheel 52 for the protection of the flexible material of the body.

Figure 6:
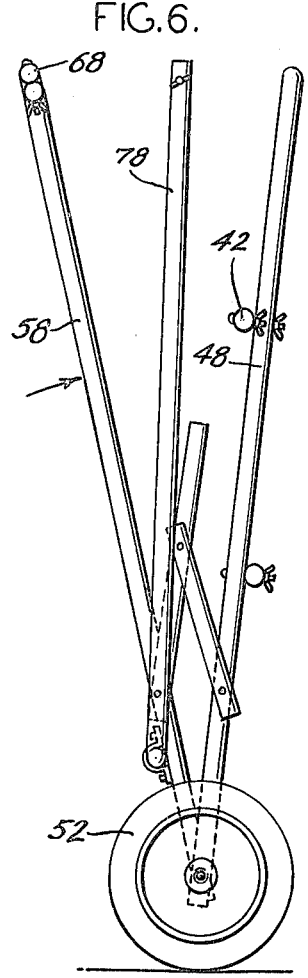
FIG. 6 is a side elevation of the frame in a partially folded condition.

Referring to FIG. 6, which shows the frame in a partially folded condition, the bottom frame member (comprising element 58) is folded upwardly toward rear frame member 48. U-shaped support 78, the position of which is determined solely by the flexible material of the body when the cart is open, remains between the principal frame members, and the lengths of elements 42 and 68, as seen in FIGS. 3 and 5, are desirably such as to overlap the ends of U-shaped support 78 to insure that it remains between the principal frame members when the cart is folded. When the cart is folded, the principal frame members are very nearly parallel, and the cart can be stored in a relatively small space.

Figure 7:
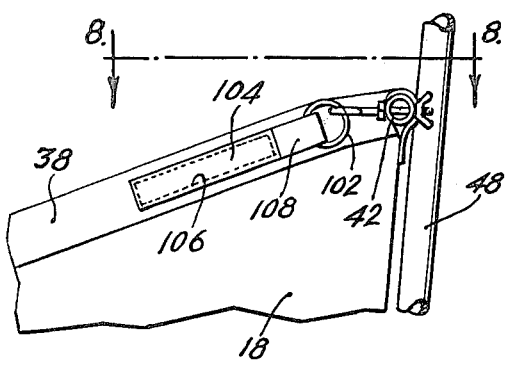
FIG. 7 is a fragmentary side elevation showing the details of a tightening mechanism for the fabric body of the cart.
Figure 8:
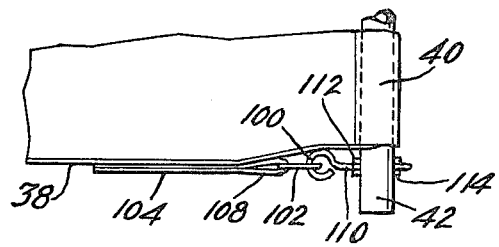
FIG. 8 is a fragmentary top plan view illustrating further details of the tightening mechanism.
Figure 9:
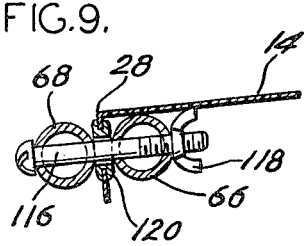
FIG. 9 is a vertical section taken on the plane 9—9 of FIG. 3 and showing the details of the protective clamping means at the front edge of the bottom wall of the body.

The manner in which the flexible material of the body is secured to the framework is best illustrated in FIGS. 7, 8 and 9. As shown in FIG. 8, tubular hem 40 is formed at the upper end of the rear wall of the body, and tubular metal element 42 extends through the tubular hem in order to secure the body to the rear frame member.

In order to take up slack in the side walls, an adjusting means is provided comprising eye bolt 100, ring 102, and flexible strip 104, sewn at 106 (FIG. 7) to hem 38 along the upper edge of side wall 18. Loop 108, formed in strip 104 is linked to eye bolt 100 by ring 102. Shank 110 of the eye bolt extends through element 42, and is secured by nuts 112 and 114 on either side of element 42. The length of shank 110 is such as to allow a range of adjustment for the tension in seams 38 and 32 (FIG. 1) respectively along the upper and front edges of side wall 18 in order to take up slack in the side wall. The tension produced by this adjustment is carried entirely by the reinforcing hems, and no force is transmitted through the seam at the intersection of the side wall and the rear and bottom walls or any other seam.

Side wall 16 on the opposite side of the body is similarly tensioned by means of an eye bolt at the opposite end of element 42.

As shown in FIG. 9, the front edge 28 of bottom 14 of the flexible body is clamped between frame element 66 and clamping member 68 by means of a bolt 116, which extends through elements 68 and 66 and is secured by a wing nut 118. This bolt extends through a grommet 120 provided at the front edge of the flexible material of the bottom of the body. Referring to FIG. 1, similar grommets are provided along the front edge for receiving bolts 122, 124 and 126, bolt 122 serving to secure element 68 to frame element 62, and bolts 124 and 126 securing clamping member 70 to element 68. Additional bolts 128 and 130 are provided to secure the extreme ends of clamping element 68 to frame elements 62 and 66. Bolts 128 and 130, however do not pass through grommets in the flexible material. Rather, grommets 132 and 134 are provided in vertical hem sections 34 and 32 respectively, and are secured to bolts 128 and 130 respectively by wire loops 136 and 138.

The flexible body can be removed and replaced readily by releasing the front edge of the bottom, the upper front corners of the sides and the upper edge of the rear wall, these being the only points of attachment to the framework.

Longitudinal frame elements 56 and 58, which underlie the bottom of the flexible material of the body provide the cart with a greatly improved load-carrying capability by providing direct support for the load. While two such members are generally adequate for carts having a side wall spacing of 36 inches, additional longitudinal supporting elements can be provided, and may be desirable in wider carts.

Longitudinally extending elements 56 and 58 also prevent the load from causing the bottom of the body to bulge downwardly, forming large pockets which impede dumping of the cart when it is tilted forwardly. Lateral sections 62 and 66 of these elements also serve as part of the clamping means for the front edge of bottom wall 14 of the body.

All of the elements of the frame member underlying the bottom of the fabric body lie substantially in a plane which is inclined upwardly from protective clamping element 68 toward the rear of the cart. The inclination of these elements insures that minor irregularities and obstacles underneath the body but behind the front edge of the bottom do not hold the front edge off the ground making it difficult to rake leaves, cuttings and other debris into the cart.

The compactness of the cart is greatly enhanced by the positioning of the wheels behind rather than to the sides of the body. This is made possible by the protective function of the collapsible braces. The collapsible braces also assist the longitudinal elements of the bottom frame member in supporting the load.

When the cart is tilted rearwardly for transporting the load, the load is supported not only by the bottom frame member and the collapsible braces, but also by the rear frame member 48.

Element 68 also performs a multiple function in that it is used not only to secure the front edge 28 (FIG. 1) of the flexible bottom 14 to the framework, but also protects front edge 28 from being damaged by the tines of a rake or by abrasion occurring in the process of dumping the contents of the cart.

Various modifications can be made to the structure specifically described. For example, the collapsible braces can be reversed so that the longer element of each brace is connected to the vertical rear frame member rather than to the bottom frame member. The wheels can be positioned between the vertical elements of frame member 48. Various other modifications can be made in the materials used and in the frame configuration, as well as in the body configuration, without departing from the scope of the invention as defined in the following claims.

I claim:

1. A folding cart comprising:
    a scoop-shaped body of flexible sheet material, said body, when in an opened condition, having an open front, a bottom wall, a rear wall, and side walls extending upwardly from the bottom wall;
    a pair of wheels rotatable on an axis located adjacent the intersection of said rear wall and said bottom wall;
    frame means comprising a first substantially rigid frame member extending substantially from the front edge of said bottom wall to said axis, and a second substantially rigid frame member extending substantially from said axis at least to the upper edge of said rear wall;
    said first and second frame member being pivotally connected together substantially at the location of said axis, whereby the upper edge of said rear wall can be brought into close proximity to the front edge of said bottom wall;
    said first frame member comprising means extending longitudinally from the front edge of said bottom wall substantially to the location of said axis, and providing support for said bottom wall from the front edge to the rear of said bottom wall, said longitudinally extending means being spaced laterally inwardly from said side walls;
    said wheels being located behind said body and laterally inward with respect to said side walls; and
    means, connected to said frame means for preventing contact between said material and said wheels, when said body is in its opened condition.

2. A folding cart according to claim 1 in which said means for preventing contact between said material and said wheels comprises brace means for preventing said frame members from being folded toward each other.

3. A folding cart according to claim 1 in which said means for preventing contact between said material and said wheels comprises collapsible brace means for preventing said frame members from being folded toward each other.

4. A folding cart according to claim 3 in which said collapsible brace means comprises a first element pivotally secured at one end to said first frame member and rotatable about an axis substantially parallel to the wheel axis and a second element pivotally secured at one end to said second frame member and rotatable about an axis substantially parallel to said wheel axis, said first and second elements being hinged together at an intermediate location between said frame members, and one of said first and second elements extending beyond the location at which said elements are hinged together and being adapted to contact, with its opposite end, the frame member to which the other of said first and second elements is pivoted, the length of said one of said first and second elements being such that said opposite end contacts the last-mentioned frame member only when said elements are moved slightly beyond their parallel condition in the unfolding direction.

5. A folding cart according to claim 1 in which said second frame member comprises means extending behind said rear wall in a direction perpendicular to said axis from the upper edge of said rear wall substantially to the location of said axis, said means of the second frame member being spaced laterally inwardly from the side walls.

6. A folding cart according to claim 5 in which said means for preventing contact between said material and said wheels comprises collapsible brace means for preventing said frame members from being folded toward each other, said collapsible brace means extending from said longitudinally extending means of the first frame member to the means of the second frame member which extends behind the rear wall of the scoop-shaped body, and said collapsible brace means being substantially between said wheels and said flexible sheet material when said body is in its opened condition.

7. A cart comprising:

a scoop-shaped body of flexible sheet material, said body having an open front, a bottom wall, a rear wall, and side walls extending upwardly from the bottom wall;

a pair of wheels rotatable on an axis located adjacent the intersection of said rear wall and said bottom wall; and frame means comprising a substantially rigid frame member extending substantially from the front edge of said bottom wall to said axis;

said frame member comprising at least two rigid members extending longitudinally from the front edge of said bottom wall substantially to the location of said axis, and providing support for said bottom wall from the front edge to the rear of said bottom wall, said longitudinally extending means being spaced from each other and laterally inwardly from said side walls, in which each of said rigid members comprises a section extending laterally along the front edge of said bottom wall, and having a substantially rigid clamping member extending along said front edge from one side wall to the other forward of said section of each rigid member, said front edge of said bottom wall being clamped between said clamping member and said laterally extending sections.

8. A folding cart comprising:

a scoop-shaped body of flexible sheet material, said body, when in an opened condition, having an open front, a bottom wall, a rear wall, and side walls extending upwardly from the bottom wall;

frame means comprising a first substantially rigid frame member extending substantially from the front edge of said bottom wall to a pivot axis adjacent the intersection of said bottom and rear walls, and a second substantially rigid frame member extending substantially from said pivot axis at least to the upper edge of said rear wall; said first and second frame members being pivotally connected together at the location of said pivot axis, whereby the upper edge of said rear wall can be brought into close proximity to the front edge of said bottom wall; and said first frame member comprising means extending longitudinally from the front edge of said bottom wall substantially to the location of said pivot axis, and providing support for said bottom wall from the front edge to the rear of said bottom wall, said longitudinally extending means being spaced laterally inwardly from said side walls, and said second frame member comprising means extending behind said rear wall in a direction perpendicular to said pivot axis, from the upper edge of said rear wall substantially to the location of said pivot axis, said means of the second frame member being spaced laterally inwardly from the side walls and providing support for said rear wall; and a pair of wheels rotatably mounted on said frame means adjacent the intersection of said bottom and rear walls, said wheels being rotatable on an axis parallel to the pivot axis of said frame.

9. A folding cart according to claim 8 in which said second frame member comprises at least two rigid members extending behind said rear wall in a direction perpendicular to said pivot axis, said rigid members extending at least from the upper edge of the rear wall substantially to the location of said axis, and being laterally spaced from each other and being spaced laterally inward from said side walls.

* * * * *